United States Patent [19]
Szabo

[11] 3,775,005
[45] Nov. 27, 1973

[54] INTERACTIVE PHOTOGRAPHIC TRANSPARENCY DISPLAY DEVICE

[75] Inventor: Nicholas S. Szabo, Cupertino, Calif.

[73] Assignee: The Singer Company, Binghamton, N.Y.

[22] Filed: Apr. 7, 1972

[21] Appl. No.: 242,155

[52] U.S. Cl.................... 353/42, 35/9 C, 353/84
[51] Int. Cl.......................... G09b 7/02, G09b 7/06
[58] Field of Search................ 353/42; 35/9 A, 9 B, 35/9 C

[56] References Cited
UNITED STATES PATENTS
3,277,588  10/1966  Lymott................................. 35/9 C
3,662,078  5/1972  Holiday................................. 35/9 C FOREIGN PATENTS OR APPLICATIONS
1,122,655  9/1956  France................................. 35/9 C

*Primary Examiner*—Louis R. Prince
*Assistant Examiner*—A. J. Mirabito
*Attorney*—Francis L. Masselle

[57] ABSTRACT

A device for displaying photographic transparencies which is capable of interaction with an operator employing a lasing-diode light pen. Two optical systems are provided which utilize filtering means for restricting light conduction within two mutually exclusive bands of wavelengths. One optical system conducts exclusively light having wavelengths which reside within the visual spectrum, and is used for projecting an image from a transparency onto a viewing screen. The second optical system conducts exclusively light having wavelengths within the infrared region, and is used for detecting operator response to an image displayed on the viewing screen. The transparencies are coated over a substantial area thereof with a light filtering material which will inhibit the transmission of infrared light, but will transmit light within the visual spectrum. A small area on the transparency, which corresponds to the correct response, is not coated with the light filtering material and will transmit all light. A photodetector is disposed within the second optical system for detecting light from the lasing-diode light pen. An electrical circuit is also provided between the light pen and the photodetector for improving the signal-to-noise ratio.

8 Claims, 5 Drawing Figures

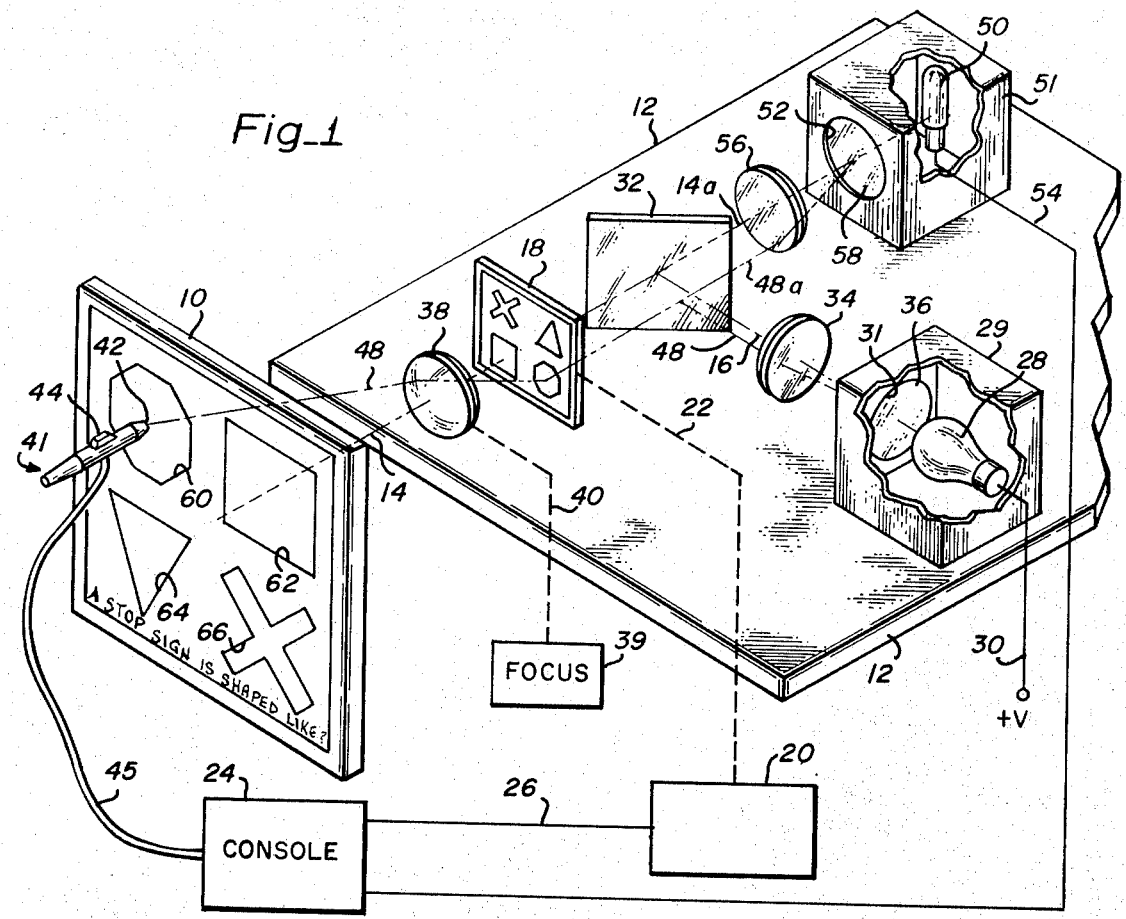
Fig_1
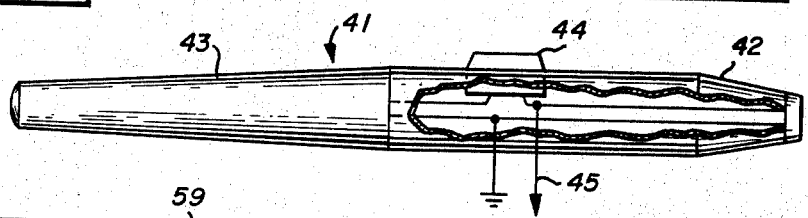
Fig_2
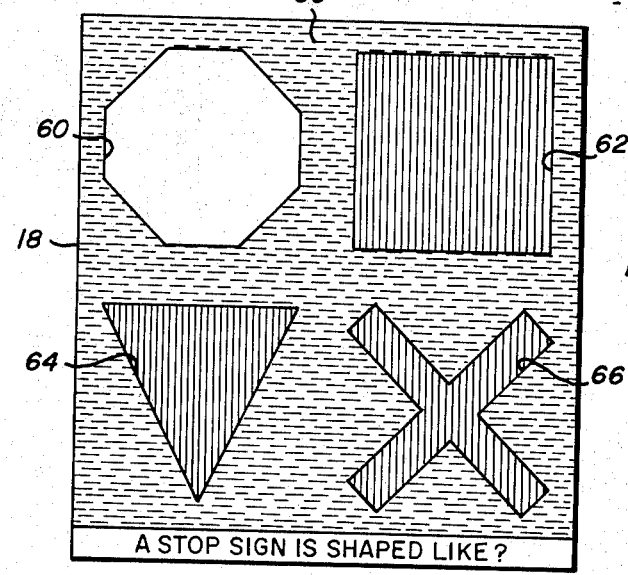
Fig_3

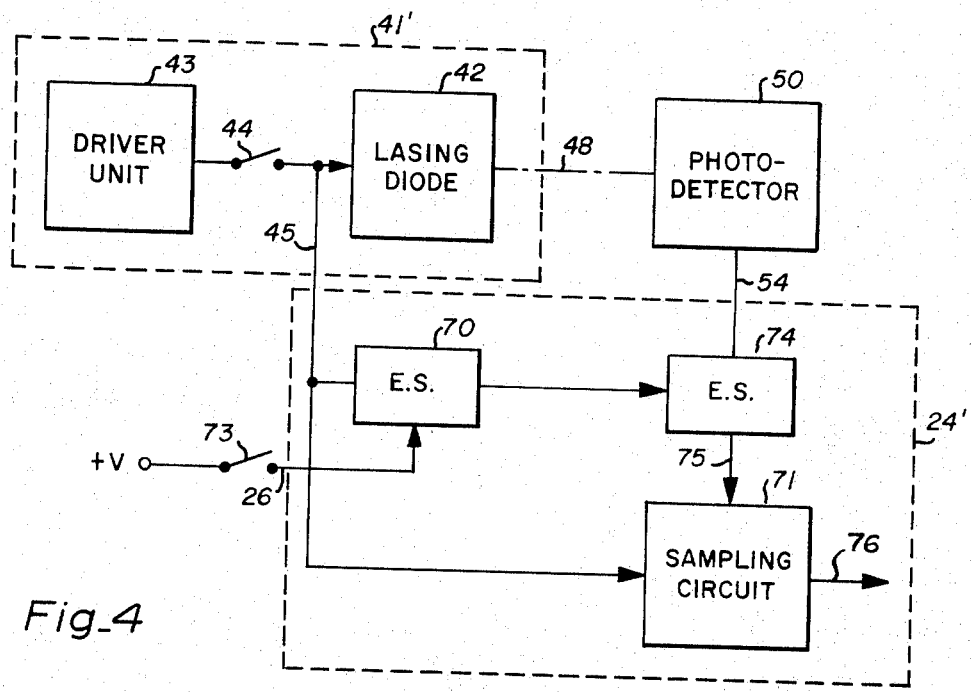
*Fig_4*
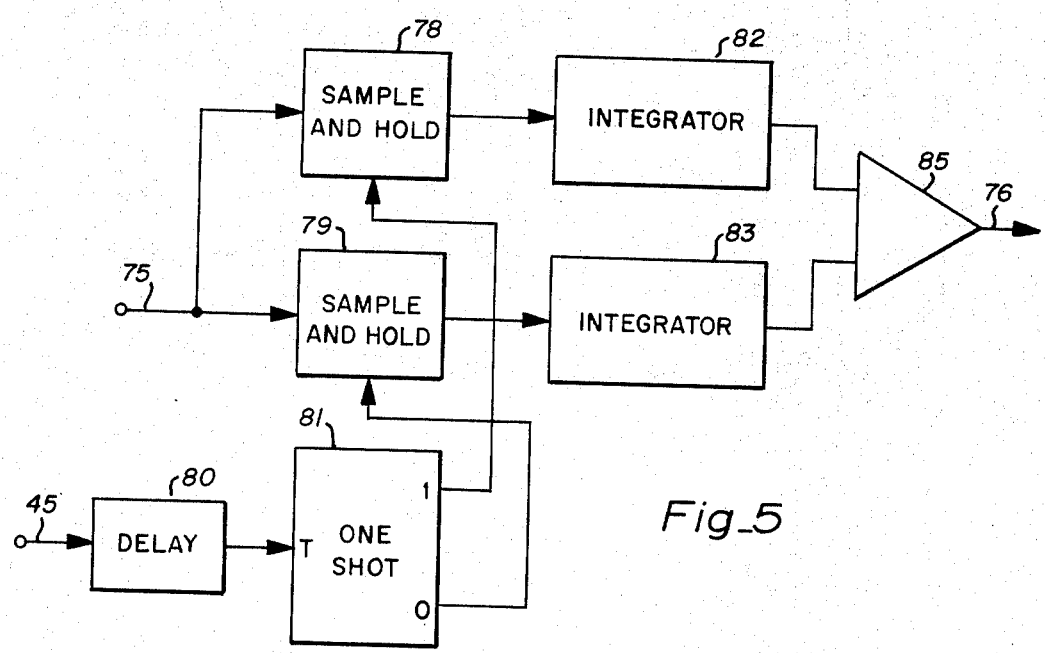
*Fig_5*

INTERACTIVE PHOTOGRAPHIC TRANSPARENCY DISPLAY DEVICE

BACKGROUND OF THE INVENTION

This invention relates generally to devices for viewing photographic transparencies, and more particularly to programmed-insturction devices which are responsive to operator interaction therewith.

This invention has a particular use in educational devices wherein a student can receive instruction on a given subject and can flexibly respond to questions asked during such instruction. However, the scope of this invention is not limited to such use.

Before continuing the discussion of the prior art and describing the present invention, it is pointed out that "interact" as used herein is intended to denote the reciprocal acts of displaying an image on a viewing screen, operator response to the image displayed, and identification of the response made to the image displayed.

There exists a need for display devices wherein the operator can interact directly with an image, or part of the image displayed on a viewing screen. One such display device is the cathode ray tube (CRT) and appropriate controls. An image is displayed on the face of the CRT by apolying appropriate signals in sequence to the deflection coils, control grids, and cathode of the CRT. When a pen is applied to a part of an image displayed on the face of the CRT, sensing the presence of the pen is accomplished by detecting light from the CRT beam passing across the pen tip. The location of the pen with respect to the image displayed on the CRT face is determined by a calculation of which raster element and what part of the raster element the pen was detected.

A disadvantage of employing CRT display systems is that expensive control devices are required to drive the CRT. Also, the CRT display system offers more flexibility of operation than is required in most programmed-instruction devices.

Some photographic transparency display devices are equipped with keying mechanisms for an operator to respond to images displayed on a viewing screen. One such device is disclosed in U.S. Letters Patent No. 3,344,709 issued to Stanford E. Taylor. In programmed-instruction, a response to multiple choice questions is made by depressing a key which corresponds to the operator's selected answer. The key, in turn, operates a switch connected to circuitry to indicate whether or not the appropriate response was selected This type of device is limited in its flexibility due to the fact that the operator cannot interact directly with the image displayed on the viewing screen.

SUMMARY OF THE INVENTION

The present invention contemplates a device for displaying photographic transparencies comprising a translucent viewing screen and a positioning mechanism for holding a transparency to be displayed, two light sources having wavelengths which reside within two mutually exclusive bands, and two optical systems. A first optical system is employed for projecting an image from the transparency onto the viewing screen by utilization of one light source, and the second optical system is employed for directing light from the second light source to a photodetector means.

In accordance with a particular feature of the present invention, the photographic transparencies have been coated in preselected areas with a material which will conduct light which has wavelengths that reside within a limited band, and this limited band of wavelengths includes light produced by the second light source.

Accordingly, it is a fundamental object of the present invention to provide a novel photographic transparency display device which is capable of direct operator interaction.

Another object of the present invention is the provision of a unique photographic transparency which has capabiities of discriminating between light having one band of wavelengths and light having wavelengths without this band.

A further object of the present invention is a photographic transparency display device which provides a light detecting means having an improved signal-to-noise ratio.

A still further object of the present invention is the provision of a programmed-instruction device as characterized in the preceding objects which is simple in construction, and is relatively inexpensive.

Other objects of the present invention will become apparent in the details and arrangement of its parts and in the combination thereof, reference being had to the following description of the preferred embodiment and accompanying drawings for a full description and illustrartion of the invention.

BRIEF DESCRIPTION OF THE DRAWINGS

FIG. 1 is a perspective view of a photographic transparency display device constructed in accordance with the principles of the present invention;

FIG. 2 is a partially cut-away elevational view of the operator's interacting light pen;

FIG. 3 is a diagram of a typical photographic transparency with the coating of light filtering material applied thereon;

FIG. 4 is a block diagram of the control circuit employed in the present invention; and FIG. 5 is a schematic diagram of the sampling circuit.

DESCRIPTION OF THE PREFERRED EMBODIMENT

With reference to the drawings in detail and in particular to FIG. 1, there is shown a translucent screen 10 for viewing images projected thereon. Translucent viewing screen 10 is aligned perpendicularly to a plane which is coincident with an optics baseplate 12. Baseplate 12 provides a firm mounting for two optical systems which are enclosed within a cabinet (not shown). The cabinet provides a means for maintaining the alignment of screen 10 to baseplate 12, and, provides protection for the optical systems.

The first optical system is disposed along two perpendicular axes 14 and 16 for projecting an image onto viewing screen 10. A photographic transparency 18 is positioned for display by selection-and-control mechanism 20 connected to console 24 via electrical conductor 26 for operation thereof. Console 24 contains the control circuitry for operation of the present invention and will be explained in greater detail with the description accompanying FIGS. 4 and 5. Accordingly, an individual transparency is selected and positioned for display by closure of a switch, which is shown schematically in FIG. 4. It is pointed out that an individual transparency 18 can be transported manually to a position for display. Therefore, selection-and-control mechanism 20 is not a required component for the intended function of the present invention.

Before continuing the description of a preferred embodiment of the present invention, it is pointed out that "blue light" as used herein is intended to denote light having wavelengths which reside within the lower portion of the visual spectrum. Likewise, "red light" is intended to denote light having wavelengths which reside above that of the visual spectrum.

Light source 28 is enclosed within housing 29 and is provided with electrical power from a conventional source via electrical conductor 30. Housing 29 has a single opening 31 for the passage of light from source 28 along optical axis 16. A beam-splitting mirror 32 is located at the intersection of the axes 14 and 16, and is positioned in a plane which makes a 45° angle with each of the respective axes. A condenser lens 34 is disposed along axis 16 between housing 29 and mirror 32 for directing light from source 28 onto the mirror. The optical axis of lens 34 is coincident with optical axis 16. Light filter 36 is mounted in opening 31 of housing 29 to inhibit the transmission of red light and to transmit therethrough exclusively blue light.

Object lens 38 is provided between transparency 18 and screen 10 to form an image from the transparency onto the screen. The optical axis of lens 38 is coincident with optical axis 14. Lens 38 is positioned along optical axis 14 by an adjustment mechanism 39 as indicated by broken line 40. The adjustment mechanism is used by the operator to focus the image from transparency 18 on screen 10.

The projection of the image from transparency 18 onto screen 10 is effected in the conventional manner of passing light through the transparency. The blue light from source 28, via filter 36, is deflected in a direction towards screen 10 by mirror 32 and then passes through transparency 18 and lens 38, whereby an image is formed on one side of screen 10. An observer viewing the opposite side of the screen will be able to see the image projected thereon since the viewing screen is translucent.

As appears in FIG. 2, light pen 41 contains a gallium aresenide lasing diode 42 affixed to one end thereof. A driver unit 43 supplies power to the diode 42 via switch 44. The gallium arsenide lasing diode 42 with associated driver unit 43 may be, for example, that manufactured by Data Optics of Menlo Park, California. This device is sold under Model No. DOC 100,000. THe wavelength of the light emitted from the diode is within the infrared region, such as a wavelength of 9050 Angstroms. Driver unit 43 has a peak power output of 5 watts, and pulses are supplied therefrom at a repetition rate of 10 kilocycles.

When power is supplied to diode 42 by closure of switch 44, a beam of monochromatic light is emitted from the diode. Also, a signal is transmitted on line 45 for operation of control circuitry of the present invention, which will be explained in greater detail hereinbelow.

When light pen 41 is placed against viewing screen 10 the beam of monochromatic light from diode 42 is diffused upon passage through the screen, and is represented in FIG. 1, as a set of rays, by dashed line 48. The second optical system is disposed along an extension 14a of optical axis 14 for detection of rays 48a. A photodetector 50 is enclosed within housing 51, which has a single opening 52 for the passage of light. Electrical signals which are indicative of light impinging upon photodetector 50 are transmitted to console 24 via electrical conductor 54.

A condenser lens 56 focuses rays 48a onto the surface of light filter 58 which is mounted in opening 52 of housing 51. Filter 58 transmits therethrough red light which includes exclusively wavelengths equal to that of rays 48a. Therefore, differentiation is made at photodetectro 50 between rays 48a and ambient light by the restriction of light that strikes the surface of the photodetector. Light filter 36 inhibits the transmission of red light which includes the wavelength or rays 48, and thereby lessens the possibility of an erroneous indication of light received by photodetector 50. Also, the device housing, which is not shown, will prevent extraneous light from interfering with the operation of this device.

It will be shown from the discussion accompanying FIGS. 4 and 5 hereinbelow that an additional feature may be employed for discriminating between the monochromatic light of diode 42 and ambient light.

A preferred embodiment of the present invention employs photographic transparencies which have been coated in select areas of the surface with dichroic light filtering material. A unique feature of this coating material is that the visible light spectrum can be divided into two energy bands, i.e. red light and blue light. he dichroic material can be coated onto a transparency, for example, by Optical Coating Laboratory, Inc., of Santa Rosa, California.

FIG. 3 shows a typical transparency 18 with the dichroic filter coating illustrated by vertical line shading. The question shown is for illustration only and by no means limits the applications of the present invention. Many states have a question on the written examination for a driver's license similar to that shown in FIG. 3. The examinee is asked to identify the object that is shaped like a stop sign.

Background area 59 of transparency 18 is illustrated by horizontal dashed lines to depict metallic silver coating which is a result of the photographic developing process. This area will not transmit light and will appear dark when the image is projected onto screen 10l The areas outlined by objects 60, 62, 64 and 66 are made transparent to light by conventional photographic development processing. However, the areas outlined by objects 62, 64 and 66 are, in turn, coated with dichroic light filtering material which inhibit the transmission of red light such as that produced by lasing diode 42. The dichroic filter coating will transmit exclusively blue light. Since the image from transparency 18 is projected onto the screen 10 by blue light, the coating applied to the areas outlined by objects 62, 64 and 66 will not alter the intensity of the images formed on the screen. Therefore, an observer will not be able to distinguish any differences between object 60 and objects 62, 64 and 66.

Rays 48 will pass through transparency 18 if the examinee has selected the correct response, i.e., the area that does not have the dichroic light filter coating. Rays 48 will split into two groups of rays upon striking the surface of beam-splitting mirror 32. A first group of rays 48 will reflect along optical axis 16, which is not improtant to the operation of the present invention, and will not be discussed any further. The second group of the rays 48a will continue along extension 14a of axis 14. Condenser lens 56 will concentrate rays 48a onto the surface of light filter 58. An electrical signal will be emitted from photodetector 50 when rays 48a strike filter 58 and impinge upon the surface of the photodetector.

The control circuitry associated with the present invention is shown in the block diagram of FIG. 4. The elements enclosed within dashed line 41' are parts of light pen 41, and those within dashed line 24' are parts of console 24. Line 45 is connected to one side of electronic switch 70 and to an input of sampling circuit 71. Switch 73 is connected between plus voltage and the operating terminal of switch 70. Switch 73 is physically located within positioning mechanism 20 and supplies voltage to switch 70 via line 26 when a transparency is positioned for display. The second side of switch 70 is connected to the operating terminal of switch 74. Switches 70 and 74 may be any type of electronic device such as a transistor. According to a particular embodiment of the present invention, switches 70 and 74 are non-conductive until a signal is applied to its operating terminal; whereupon they become conductive.

Line 54 from photodetector 50 is connected to one side of switch 74 and the second side of this switch is connected to the second input of sampling circuit 71 via line 75. It is the function of circuit 71 to discriminate between light received by photodetector 50 when diode 42 is energized (emitting light rays), and any light received during the time that diode 42 is not energized. Hence, this circuit helps to improve the signal-to-noise ratio for operation of the present invention. An output signal is supplied on line 76 from circuit 71 which is indicative of the operator's correct response to the question presented on the viewing screen. It should be pointed out as this juncture that circuit 71 may not be required if the optical systems are sufficiently efficient to discriminate between light within one band of wavelengths and light within a second band of wavelengths.

In operation, the operator observes the image formed on screen 10, and directs light pen 41 toward the screen in the area selected in response to the question asked. Upon closure of switch 44, the beam emitted by diode 42 strikes screen 10 and rays 48 are produced from a point on the opposite side of the screen. Switch 73 is closed by the transparency in position for display which thereby makes switch 70 conductive. The 10 kilocycle signal from driver unit 43 is passed through switch 70 to make switch 74 conductive. Signals from photoconductor 50 are then supplied on line 54, through switch 74 via line 75 to the input of sampling circuit 71. However, circuit 71 is enabled only during the positive swings of the 10 kilocycle signal from driver unit 43 which will be explained in greater detail hereinbelow.

FIG. 5 shows sampling circuit 71 in greater detail. Line 75 from switch 74 is connected to the inputs of two sample-and-hold circuits 78 and 79. Line 45 from switch 44 is connected to the input of a five-microsecond delay circuit 80. The output of delay circuit 80 is connected to the toggle input of one-shot 81. When a positive pulse is applied to the toggle input of one-shot 81, a high-level signal is supplied from the "one" output thereof for thirty microseconds. One-shot 81 is a bistable device; therefore, a low-level signal is supplied from the "zero" output during the same 30-microseconds. At the end of the 30-microsecond time interval, one-shot 81 reverses state.

The "one" output of one-shot 81 is connected to the enable input of sample-and-hold circuit 78, and the "zero" output of the one-shot is connected to the enable input of sample-and-hold circuit 79. The output of sample-and-hold circuit 78 is connected to integrator 82, and the output of sample-and-hold circuit 79 is connected to the input of integrator 83. The output of integrator 82 is connected to an input of differential comparator 85, and the output of integrator 83 is connected to a second input of the differential comparator. The output of comparator 85 is connected to line 76. The differential comparator may be, for example, a high-speed differential comparator, Model No. 710, manufactured by Fairchild Semiconductor of Mountain View, California.

Sample-and-hold circuit 78 is enabled, or gated to receive an input signal from the lasing diode, when the "one" output of one-shot 81 is at a high-level. This occurs five-microseconds after a positive pulse is applied on line 45 from driver unit 43, and lasts for 30-microseconds. Sample-and-hold circuit 79 is enabled, or gated to receive an input signal from the lasing diode, when one-shot 81 changes to a reset state, and this lasts until the one-shot is again changed to a set state. In effect, sample-and-hold circuit 78 is enabled substantially during the time that diode 42 is emitting light, and sample-and-hold circuit 79 is enabled during the time when diode 42 is not emitting light. However, it is pointed out that the signal on line 75 is present only during the time that a transparency is in position for display and switch 44 is closed.

Integrator 82 integrates the signal accumulated by sample-and-hold circuit 82 and applies this signal to comparator 85. Likewise, integrator 83 integrates the signal accumulated by sample-and-hold circuit 83 and applies this signal to the second input of comparator 85. It is a characteristic of comparator 85 that a signal is applied on line 76 when the magnitude of the signal from the output of integrator 82 is greater than the magnitude of the signal from the output of integrator 83.

The signal from integrator 83 represents noise caused by extraneous light impinging photodeector 50, and the signal from integrator 82 represents the signal from the photodetector as a result of the light emitted from diode 42. Therefore, the resultant signal on line 76 is representative of light from diode 42 impinging the photodetector minus any extraneous light.

The signal on line 76 may be used for directly indicating the operator's response, or for recording a set of responses. Any variety of means may be employed for indicating or recording the operator's response. For example, a recording device could be employed which would tabulate each response and provide an indication to the examinee of his score after completing a series of questions. Another means could be employed that would select the subsequent transparency to be viewed as a result of the examinee's response. If the correct response is made, then the next transparency in the examination would be selected. However, if an incorrect response were detected, then an alternate transparency would be selected that would be deigned to help the examinee with a problem. This procedure, of course, is programmed instruction.

Generally, the present invention could be used whenever a particular selection is to be made from a group, wherein the particular selection is equivalent to the correct response and the group is defined by image on the transparency.

While a specific embodiment of the present invention has been shown and described hereinabove, further modifications and improvements will occur to those skilled in the art. It is requested that one understand, therefore, that this invention is not limited to the particular form shown and it is intended that the appended claims cover all modifications which do not depart from the spirit of this invention.

What I claim is:

1. An interactive photographic display device comprising:
   a. a translucent viewing screen;
   b. means for holding a transparency to be displayed;
   c. a lasing diode which produces light rays having wavelengths which reside within a limited band and being movable to various points on said screen;
   d. a light source which has wavelengths which reside without said band;
   e. a first optical system disposed for projecting an image from said transparency in said holding means onto said viewing screen by means of said light source;
   f. means for detecting light;
   g. a second optical system disposed for conducting said light rays passing through said screen to said detecting means; and
   h. restricting means for conducting through said second optical system light having wavelengths which reside exclusively within said band.

2. A device as defined in claim 1 which includes circuit means operatively connected bewteen said lasing diode and said light detecting means for descriminating between light emitted by said lasing diode and extraneous light.

3. A device as defined in claim 2, wherein said circuit means comprises:
   a. a bistable one-shot having an input connected to said lasing diode;
   b. a pair of gated sample-and-hold circuits having their inputs operatively connected to said light detecting means, a first of which is responsive to one state of said bistable one-shot and a second of which is responsive to a second state of said bistable one-shot;
   c. a pair of integrators having their inputs operatively connected to respective outputs of said pair of gated sample-and-hold circuits; and
   d. a differential comparator having a first input operatively connected to an output of a first of said pair of integrators, and a second input operatively connected to the output of a second of said pair of integrators, whereby the output of said differential comparator is an indication of a response.

4. A device as defined in claim 1, wherein said display includes a transparency having discrete transparent regions some of which are coated with a dichroic light filtering material.

5. A device as defined in claim 1, wherein said band includes light having wavelengths that reside within the infrared region.

6. A device as defined in claim 5, wherein said first light source is an incandescent light and a dichroic light filter.

7. A device as defined in claim 6, wherein said restricting means is a dichroic light filter.

8. An interactive photographic display device comprising:
   a. a translucent viewing screen;
   b. means for holding a transparency to be displayed;
   c. a lasing diode which produces light rays having wavelengths which reside within the infrared region and being movable to various points on said screen;
   d. An incandescent light source and a dichroic light filter for restricting light to that having wavelengths which reside within the infrared region;
   e. a first optical system disposed for projecting an image from said transparency in said holding means onto said viewing screen by means of said light source;
   f. a photodetector;
   g. a second optical system disposed for conducting said light rays passing through said screen to said photodetector; and
   h. a dichroic light filter for restricting the conduction of light through said second optical system to that having wavelengths which reside exclusively within the infrared region.

* * * * *

UNITED STATES PATENT OFFICE
CERTIFICATE OF CORRECTION

Patent No. 3,775,005           Dated November 27, 1973

Inventor(s) Nicholas S. Szabo

It is certified that error appears in the above-identified patent and that said Letters Patent are hereby corrected as shown below:

Column 1, line 26, change "apolying" to --applying--.

Column 3, line 49, change "THe" to --The--.

Column 4, line 27, change "he" to --The--.

Column 4, line 43, change "101" to --10--.

Column 4, line 64, change "improtant" to --important--.

Column 5, line 34, change "as" to --at--.

Column 7, line 33, change "bewteen" to --between--.

Signed and sealed this 21st day of May 1974.

(SEAL)
Attest:

EDWARD M.FLETCHER,JR.
Attesting Officer

J. MARSHALL DANN
Commissioner of Patents